July 4, 1950 W. R. LE PAGE 2,514,284
PHOTOELECTRIC MEASURING DEVICE
Filed July 12, 1946

INVENTOR.
WILBUR R. LE PAGE
BY
*M. A. Hayes*
ATTORNEY

Patented July 4, 1950

2,514,284

UNITED STATES PATENT OFFICE 2,514,284

PHOTOELECTRIC MEASURING DEVICE

Wilbur R. Le Page, Rochester, N. Y., assignor to the United States of America, as represented by the Secretary of the Navy Application July 12, 1946, Serial No. 682,997

3 Claims. (Cl. 315—10)

My invention relates to measuring devices and more particularly to devices for providing electrical indications of the interrelation of an independent variable and a multiplicity of dependent variables.

In accordance with my invention, an electronic indicator accurately measures the relation between an independent variable (such as time, frequency, etc.) and a multiplicity of dependent variables (for example current, voltage, etc.).

Further in accordance with my invention, a sweep voltage and a signal marker scale are produced for a cathode ray tube, both in synchronism with an independent variable, such as frequency.

My invention further resides in systems utilizing this device to achieve new and improved results.

For an understanding of my invention and for illustrations of examples thereof, reference is made to the accompanying drawings, in which.

Figure 1:
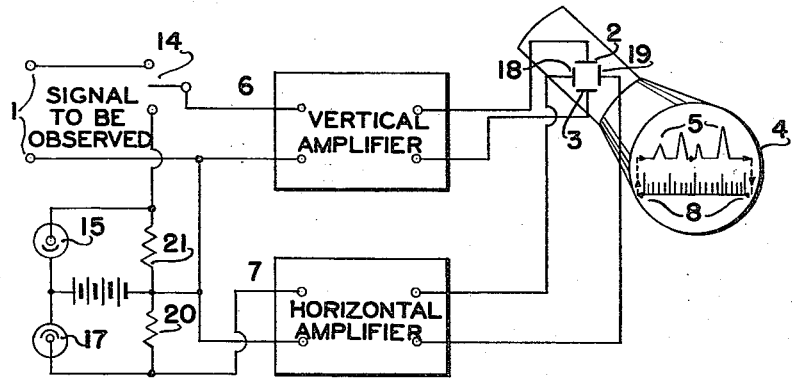
Fig. 1 is a simple diagram of the electrical circuit and oscilloscope screen, showing input signals and signal markers.

My invention is described as used in panoramic receivers, such as are discussed in the article "Panoramic Reception," appearing in Electronics for June 1940, volume 13, page 14. The tuning of the receiver is swept through its frequency range at a more or less high rate, and at the same time the output 1 of the receiver as seen in Fig. 1 is applied through a vertical amplifier 6 to the vertical deflection plates 2, 3 of a cathode ray oscilloscope tube 4 while the beam is swept horizontally in some prescribed way as the tuning of the receiver is varied, one sweep of the beam corresponding to one sweep of the receiver through its range. Thus, each position of the spot corresponds to a given frequency, and if the sweep is repeated, and a fluorescent screen of sufficient persistence is used in the cathode ray tube, a vertical line or pip 5 will appear at every point where there is a received signal. If the ranges of sweeps of the cathode ray and of the receiver always remain fixed, a fixed scale of frequencies can be used on the oscilloscope screen. However, if the range of frequencies is large and it is desirable to obtain an accurate determination of the frequency of the received signal, this may not be sufficient. The gain of the amplifier 7 which supplies the horizontal sweep signal to deflecting plates 18, 19 may be increased, thereby increasing the resolution. However, when this change is made, the old frequency scale is no longer applicable and a new one must be substituted to make it possible to read frequency. It is proposed that this scale change be accomplished automatically by forming the scale electrically on the oscilloscope screen. The pulses 8 which form the scale will be applied to the vertical deflecting plates during the return trace. As the horizontal scale is varied by a gain change of the sweep amplifier, this will affect the return trace by the same ratio as the forward trace is affected, and consequently the scale remains valid. This will become clear with the following discussion of an actual system.

Figure 2:
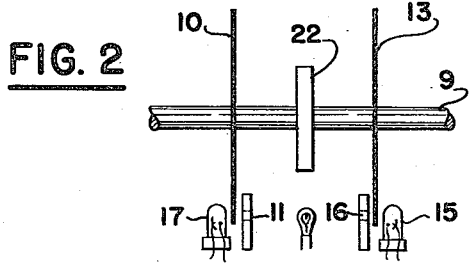
Fig. 2 is a diagrammatic view of part of the device, showing the two rotating discs and photoelectric cells.
Figures 3, 4:
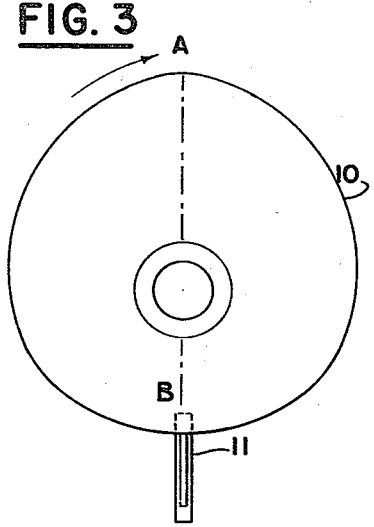
Fig. 3 is a diagrammatic front view of a light control element in the form of a non-centrally mounted disc, and a scanning slit coacting therewith, designed to provide sweep voltage by varying the illumination of a photo-electric device, and showing one possible shape of the outer edge of the disc.
Fig. 4 is a diagrammatic front view of a companion light control element, in the form of a circular disc, mounted centrally, and used for providing signal markers, showing a coacting slit, one possible arrangement of slots in the disc, and a switch cam.

When the tuning of the receiver is varied mechanically by a motor and the oscilloscope sweep is electronically controlled by the conventional relaxation circuit, proper operation depends on accurately controlled motor speed. This is true even though an initiating pulse from the mechanical tuning system is used to initiate the sweep, since after the sweep is initiated the rate of sweep depends fundamentally on the resistance-capacity values, and the rate of frequency change depends on the motor speed. When the latter is not constant the signal pulse will dance on the screen. Rather than to provide an accurate motor speed control this invention preferably provides a sweep voltage which is determined at all times by the position of the rotor shaft 9 in Fig. 2. This is accomplished by generating the sweep voltage photo-electrically by using a rotating disc 10 with a spirally or other non-circularly cut edge as seen in Fig. 3. It will be understood that the disc illustrated is bounded by arcs of two spirals, symmetrical about a vertical line through the center of the shaft. However, it is not necessary that the return curve should be the same as the "outgoing" curve, although it is sometimes convenient. The disc 10 passes over scanning slit 11, thereby determining the amount of light which falls on photo-cell 17 and the consequent voltage drop through resistor 20 in Fig. 1. In addition to giving a rigid control of the instantaneous spot position, with respect to receiver frequency, this device also makes it possible to adjust the relationship between spot position and frequency to suit the requirements. For instance, if the frequency is not linear with angular rotation, the frequency scale on the oscilloscope can be made linear by making the trace showing spot position plotted against angular rotation also non-linear in the same way. This is readily done by proper shaping of the edge of the disc 10.

It will be assumed that the receiver traverses its frequency range in one half revolution. Accordingly the disc 10 may be made symmetrical about the line A—B and the trace is returned in the same time as is required for the forward sweep. It is not necessary, however, that the return of the luminous spot on the fluorescent screen occur at the same rate as its outgoing excursion, as the slots 12 of disc 13 may be placed to secure any necessary or desired relationship between time and spot position during the return trace. It is not even necessary that the time required for the return shall be the same as the time of the forward sweep.

On the return trace the switch 14 (operated in accordance with switch cam 22) connects output of photo-cell 15 to the vertical deflecting plates, and at the same time removes the received signal pulses from the said vertical plates. During the return trace the portion EFG of disc 13 passes over the photo-cell slit 16 and resulting pulses from the photo-cell 15 will give vertical lines on the oscilloscope screen of a length determined by the amount of current through resistor 21 in Fig. 1; these will constitute the frequency scale. In order to separate this scale from the signal pulses the return trace should be below, or above, the forward trace. This can be done by allowing a fixed amount of light to fall on the cell, in addition to the pulses, or by injecting a polarizing voltage by another pair of contacts on switch 14. The resulting pattern will then appear somewhat as shown in Figure 1, where the pulses on the upper line are signal pulses.

Figure 5:
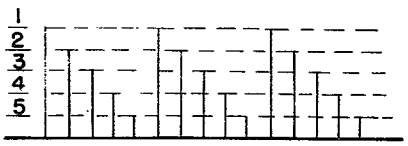
Fig. 5 is a picture of a means of externally labeling the oscilloscope tube screen to aid in taking readings.

Obviously it is impossible to label correctly, once for all time the frequency scale. If the pulses are arranged as shown with every 5th, or some other convenient number, longer, it should be possible to know the frequency of a given mark without much difficulty. However, for the case shown, if the scale is expanded later so that less than 5 marks show, it will be difficult to read the scale although it is still possible to do so by observing, before the scale is expanded, one of the marks which does not move off the screen and then reckoning from this mark after the scale has been expanded. Perhaps the arrangement in Figure 5 would be better. Horizontal marks are drawn on the screen and the pulse marks are graduated in length. In this way it is necessary to know only in which block one is located.

It is obvious that no matter what the gain of the horizontal amplifier, and hence of the frequency scale, a signal impulse will always occur at the same point on the frequency scale, since both scales are amplified in the same way. If the amplifier is not direct coupled, which means that static deflections cannot be obtained, it must have a characteristic sufficiently good not to distort the horizontal sweep voltage. In a panoramic receiver this may be only a few cycles per second, or less, and therefore this may place such severe requirements on the amplifier that it will pay to use direct coupling.

What is claimed is:

1. A photo-electric measuring device, comprising a panoramic receiver, a tuner for said receiver, a motor shaft connected to said tuner, rotating discs mounted on said motor shaft, an oscilloscope having a screen for displaying input signals, photo-electric cells cooperating with said discs for producing a horizontal sweep in one direction on said oscilloscope modulated by said input signals and for producing a horizontal sweep in the opposite direction bearing a frequency scale vertically aligned above or below, and in synchronism with, said first horizontal sweep; whereby said input signals are displayed on said oscilloscope along the horizontal sweep at a distance from the origin corresponding to the frequency to which the receiver is tuned, as read on said frequency scale.

2. A measuring device comprising two photo-electric cells, a common light source for energizing both said cells, an individual movable light control element interposed between each cell and said light source for intercepting a desired varying amount of said light, thereby varying the response of the cell correspondingly, a source of electricity, circuits connecting said source to both cells, each such circuit including a series resistor therein, two amplifiers, one having its input side connected across one of said resistors, a signal source, a switch connecting the input side of the other amplifier alternately to said signal source and to the terminals of the other resistor, mechanical means for operating said movable light control elements and said switch synchronously, and an oscilloscope including a cathode ray tube having two pairs of beam-deflecting electrodes arranged at right angles therein, one of said pairs receiving the output of one of said amplifiers while the remaining pair receives the output of the other amplifier.

3. A measuring device, as defined in claim 2, wherein the movable light control elements are mechanically connected rotating discs, and wherein a cam is provided and also mechanically connected to said discs, to rotate therewith and to actuate the switch.

WILBUR R. LE PAGE.

REFERENCES CITED

The following references are of record in the file of this patent:

UNITED STATES PATENTS

| Number | Name | Date |
| --- | --- | --- |
| 2,349,687 | Williams | May 23, 1944 |
| 2,411,741 | Michaelson | Nov. 26, 1946 |
| 2,436,827 | Richardson | Mar. 2, 1948 |